United States Patent
Wang et al.

(10) Patent No.: US 12,254,321 B2
(45) Date of Patent: Mar. 18, 2025

(54) METHOD OF RESETTING INTEGRATED CIRCUIT WITH SYNCHRONOUS RESET SIGNAL, AND INTEGRATED CIRCUIT

(71) Applicant: SANECHIPS TECHNOLOGY CO., LTD, Shenzhen (CN)

(72) Inventors: Chongyang Wang, Shenzhen (CN); Chen Lin, Shenzhen (CN); Huafeng Xu, Shenzhen (CN); Bin Guo, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/022,303

(22) PCT Filed: Aug. 19, 2021

(86) PCT No.: PCT/CN2021/113490
§ 371 (c)(1),
(2) Date: Feb. 21, 2023

(87) PCT Pub. No.: WO2022/037638
PCT Pub. Date: Feb. 24, 2022

(65) Prior Publication Data
US 2023/0325199 A1 Oct. 12, 2023

(30) Foreign Application Priority Data

Aug. 21, 2020 (CN) .......................... 202010848569.9

(51) Int. Cl.
G06F 9/4401 (2018.01)

(52) U.S. Cl.
CPC ................................. *G06F 9/4403* (2013.01)

(58) Field of Classification Search
CPC . G06F 1/24; G06F 9/44; G06F 9/4403; G06F 9/4405; G06F 9/4401
See application file for complete search history.

(56) References Cited

U.S. PATENT DOCUMENTS

| 6,473,476 B1 | 10/2002 | Banks |
| 10,050,618 B1 * | 8/2018 | White ..................... H03K 19/20 |

(Continued)

FOREIGN PATENT DOCUMENTS

| CN | 101452425 A | 6/2009 |
| CN | 101587499 A | 11/2009 |
| EP | 1615106 A1 | 1/2006 |

OTHER PUBLICATIONS

International Search Report for corresponding application PCT/CN2021/113490 filed Aug. 19, 2021; Mail date Nov. 18, 2021.

(Continued)

*Primary Examiner* — Raymond N Phan
(74) *Attorney, Agent, or Firm* — CANTOR COLBURN LLP

(57) ABSTRACT

A method of resetting an integrated circuit, includes: generating, in response to a reset signal intended for a first data unit, a synchronous reset signal based on the reset signal, and outputting the synchronous reset signal to the first data unit after at least one preset period; and generating, in response to a first data signal output by the first data unit, a second data signal based on the synchronous reset signal and the first data signal, and outputting the second data signal to a second data unit. An integrated circuit is also provided.

20 Claims, 3 Drawing Sheets

(56) References Cited

U.S. PATENT DOCUMENTS

2013/0055810 A1    3/2013  Yanagisawa
2015/0236580 A1    8/2015  Jiang
2022/0255541 A1*   8/2022  Zlotnik ............... H03K 3/0375

OTHER PUBLICATIONS

European Search Report for corresponding application EP21857730 filed Jan. 17, 2024.

* cited by examiner

METHOD OF RESETTING INTEGRATED CIRCUIT WITH SYNCHRONOUS RESET SIGNAL, AND INTEGRATED CIRCUIT

CROSS-REFERENCE TO RELATED APPLICATION

This application is a National Stage Filing of the PCT International Application No. PCT/CN2021/113490 filed on Aug. 19, 2021, which claims the benefit of Chinese Patent Application No. 202010848569.9, filed with the China National Intellectual Property Administration on Aug. 21, 2020, which is hereby incorporated by reference in its entirety.

TECHNICAL FIELD

The present disclosure relates to, but is not limited to, the field of semiconductor integrated circuits.

BACKGROUND

With the evolution of process and development of technology, Integrated Circuit (IC) design enables the integration of more and more complex functions into one chip. Generally, different functions of a chip are implemented by using different Intellectual Property Cores (IP cores) integrated in a System on Chip (SoC), which also causes the presence of a plurality of reset domains in one chip.

SUMMARY

According to a first aspect, the embodiments of the present disclosure provide a method of resetting an integrated circuit, including: generating, in response to a reset signal intended for a first data unit, a synchronous reset signal based on the reset signal, and outputting the synchronous reset signal to the first data unit after at least one preset period, wherein the reset signal is used for resetting the first data unit, and the synchronous reset signal is delayed by N preset periods relative to the reset signal, N being greater than or equal to 2; and generating, in response to a first data signal output by the first data unit and intended for the second data unit, a second data signal based on the synchronous reset signal and the first data signal, and outputting the second data signal to the second data unit, wherein the first data unit and the second data unit belong to different reset domains.

According to a second aspect, the embodiments of the present disclosure provide an integrated circuit, including: a first data unit; a second data unit belonging to a different reset domain than the first data unit; and a reset clamping unit, configured to receive a reset signal intended for the first data unit, generate a synchronous reset signal based on the reset signal, and output the synchronous reset signal to the first data unit after at least one preset period, wherein the reset signal is used for resetting the first data unit, and the synchronous reset signal is delayed by N preset periods relative to the reset signal, N being greater than or equal to 2; and receive a first data signal output by the first data unit and intended for the second data unit, generate a second data signal based on the synchronous reset signal and the first data signal, and output the second data signal to the second data unit.

DETAILED DESCRIPTION

Figure 1:
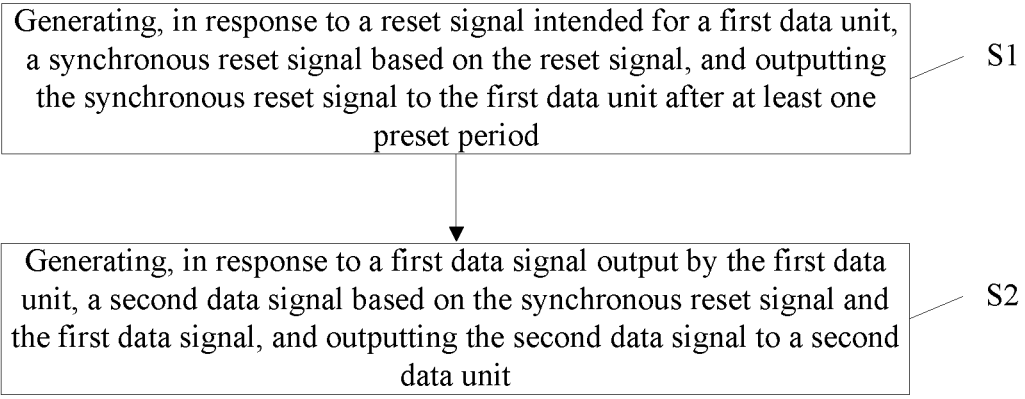
FIG. 1 is a flowchart of a method of resetting an integrated circuit provided in the embodiments of the present disclosure.

In order to enable those having ordinary skill in the art to better understand the technical solutions of the embodiments of the present disclosure, a method of resetting an integrated circuit and an integrated circuit provided in the embodiments of the present disclosure will be described below in detail with reference to the accompanying drawings.

Exemplary embodiments will be described more fully hereinafter with reference to the accompanying drawings. However, it should be noted that the exemplary embodiments may be embodied in various forms and should not be construed as limited to the embodiments set forth herein. Rather, these embodiments are provided so that the present disclosure will be thorough and complete, and will fully convey the scope of the present disclosure to those having ordinary skill in the art.

The terminology used herein is for the purpose of describing exemplary embodiments only and is not intended to be limiting of the present disclosure. As used herein, the singular forms "a", "an" and "the" are intended to include the plural forms as well, unless the context clearly indicates otherwise. It will be further understood that the terms "includes" and/or "made of", when used in this specification, specify the presence of stated features, integrals, operations, operations, elements, and/or components, but do not preclude the presence or addition of one or more other features, integrals, operations, operations, elements, components, and/or combinations thereof.

It will be understood that, although the terms first, second, etc. may be used herein to describe various elements, these elements should not be limited by these terms. These terms are only used to distinguish one element from another element. Thus, a first element, component, or module discussed below could also be termed a second element, component, or module without departing from the teachings of the present disclosure.

Unless otherwise defined, all terms (including technical and scientific terms) used herein have the same meaning as commonly understood by those having ordinary skill in the art. It will also be understood that terms, such as those defined in commonly used dictionaries, should be interpreted as having a meaning that is consistent with their meaning in the relevant art and the context of the present disclosure, and will not be interpreted in an idealized or overly formal sense unless expressly so defined herein.

With the evolution of process and development of technology, IC design enables the integration of more and more complex functions into one chip. Generally, different functions of a chip are implemented by using different IP cores integrated in a SoC, which also causes the presence of a plurality of reset domains in one chip.

Reset is to initialize a timing device for state maintaining in the circuit, so as to realize the initialization of states of the circuit, the IP core and even the chip. The chip needs a reset signal used to correctly initialize the whole chip circuit, so as to ensure that the internal logic of each part can be initialized when the chip is powered on, thereby guaranteeing the circuit to enter a definite state capable of stable operation. In addition to global reset of a chip, different IP cores also need to have an independent reset function, which is generally implemented by synchronous reset or asynchronous reset. However, since the interval between the reset evacuation moment and the effective edge of the clock is short when adopting asynchronous reset, the reset recovery time is not enough, and there is a possibility of a metastable state of the output signal. In the current stage, a manner in which the reset is asynchronous and the release is synchronous is mostly adopted, so as to reduce the probability of occurrence of the metastable state during the reset release.

However, for two logic modules which belong to different reset domains and have data signal interaction, when reset of one of the two logic modules becomes valid, data output by this logic module may have a metastable state, which may cause the spreading of the metastable state, and such spreading of the metastable state has a hidden security danger that is difficult to eliminate, which may damage normal operation of sub-modules of the chip.

The method of resetting an integrated circuit, and the integrated circuit provided in the embodiments of the present disclosure may be used for performing synchronous processing on a reset signal and then inputting the synchronous reset signal to a corresponding data unit, outputting, based on the synchronous reset signal and a data signal output by the data unit, a data signal without a metastable state, thereby effectively reducing the risk of spreading the metastable state caused by the reset operation across the reset domains when the chip performs local reset processing, and improving the reliability of the reset operation in different reset domains.

FIG. 1 is a flowchart of a method of resetting an integrated circuit provided in the embodiments of the present disclosure. As shown in FIG. 1, the method may include operations S1 and S2.

In operation S1, in response to a reset signal intended for a first data unit (i.e., a reset signal of which a receiving object is the first data unit), a synchronous reset signal is generated based on the reset signal, and the synchronous reset signal is output to the first data unit after at least one preset period.

Herein, the reset signal is supposed to reset the first data unit, and the receiving object of the reset signal refers to a final destination unit initially designated by a sending unit of the reset signal. The synchronous reset signal is delayed by N preset periods relative to the reset signal, where N being greater than or equal to 2. That is, two or more stages of synchronization (i.e., multi-stage synchronization) are performed on the reset signal to generate the synchronous reset signal, and the first data unit is reset based on the synchronous reset signal.

The first data unit may be any relatively independent logic unit that is used to implement a certain function in the chip.

As an exemplary implementation, a calculation formula for a Mean Time Between Failure (MTBF) is as follows:

$$MTBF = \frac{\exp(t_r/\tau)}{T_0 \cdot f_{in} \cdot f_{clock}}$$

wherein $t_r$ is the longest time that the metastable state may last, $\tau$ and $T_0$ are constants of electrical characteristics related to a process, $f_{in}$ is the frequency of an input signal, $f_{clock}$ is the frequency of a clock for synchronization function, i.e. a synchronous clock signal, and generally, the synchronous clock signal is synchronized with a data clock. It can be seen that the MTBF is related to the frequency of the synchronous clock signal. In practical applications, in a case where the frequency of the adopted synchronous clock signal is a low frequency, a two-stage synchronization can ensure the MTBF to reach 100 years.

In operation S2, in response to a first data signal output by the first data unit, a second data signal is generated based on the synchronous reset signal and the first data signal, and the second data signal is output to a second data unit.

Herein, the first data signal is intended for the second data unit (i.e., a receiving object of the first data signal is the second data unit), and the first data signal is a data signal generated or forwarded by the first data unit. Similar to the first data unit, the second data unit may be any logic unit in the chip, and has data interaction with the first data unit. The first data unit and the second data unit belong to different reset domains. Since a local reset is adopted, a corresponding reset signal for a local reset is different from that of the first data unit. In some implementations, the first data unit and the second data unit further belong to different power supply domains or voltage domains.

The synchronous reset signal is output to the first data unit after being delayed by a preset period, and when the first data unit is reset based on the synchronous reset signal, the first data signal may be output at the same time. In some implementations, in the operation of generating the second data signal based on the synchronous reset signal and the first data signal, the first data signal output from the first data unit is clamped with the synchronous reset signal. In a case where the synchronous reset signal is valid and the first data unit is successfully reset, the second data signal transmitted to the second data unit is fixed to zero. In a case where the synchronous reset signal is invalid and no reset processing is performed, a normal data signal is transmitted. Alternatively, the first data signal is delayed or filled with 0 based on the synchronous reset signal to generate the second data signal. Still alternatively, portions of the first data signal that have a possibility of being in a metastable state may be filtered based on the synchronous reset signal, etc.

Thus, by means of the method of resetting an integrated circuit provided in the embodiments of the present disclosure, when the first data unit is reset, a corresponding output signal is in a zero state, thereby achieving the purpose of eliminating the spreading of the metastable state across reset domains when the integrated circuit performs a local reset.

Figure 2:
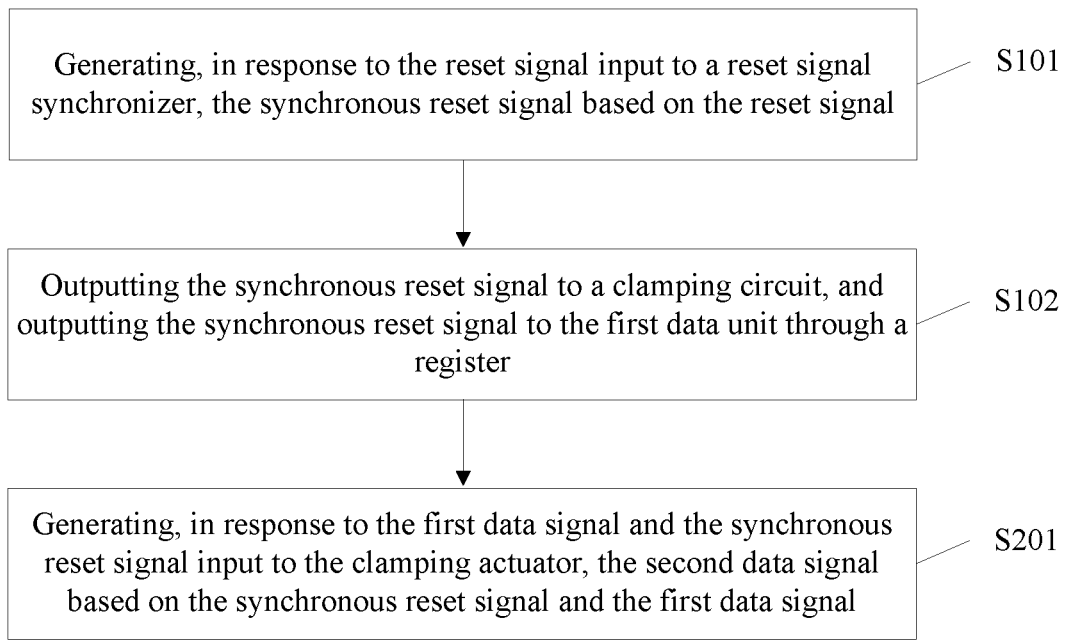
FIG. 2 is a flowchart of another method of resetting an integrated circuit provided in the embodiments of the present disclosure.

FIG. 2 is a flowchart of another method of resetting an integrated circuit provided in the embodiments of the present disclosure. As shown in FIG. 2, the method is an implementation based on the method shown in FIG. 1. Exemplarily, operation S1 includes operation S101 and operation S102, and operation S2 includes operation S201. The operation S101, the operation S102 and the operation S201 are described in detail below.

In operation S101, in response to the reset signal input to a reset signal synchronizer, the synchronous reset signal is generated based on the reset signal.

In some implementations, the reset signal synchronizer is an N-stage register synchronizer, and each preset period is a cycle of a synchronous clock signal. The operation of generating the synchronous reset signal based on the reset signal in operation S101 includes: the synchronous reset signal is generated by delaying a starting moment of the reset signal until a preset trigger edge after N cycles of the synchronous clock signal.

In operation S102, the synchronous reset signal is output to a clamping circuit, and the synchronous reset signal is output to the first data unit through a delay register.

In some implementations, the operation of outputting the synchronous reset signal to the first data unit through the delay register in operation S102 includes: the synchronous reset signal is delayed, through the delay register, by a cycle of a synchronous clock signal and the delayed synchronous reset signal is output to the first data unit.

In operation S201, in response to the first data signal and the synchronous reset signal input to the clamping circuit, the second data signal is generated based on the synchronous reset signal and the first data signal.

In some implementations, in operation S201, the operation of generating the second data signal based on the synchronous reset signal and the first data signal includes: the synchronous reset signal and the first data signal are input to a clamping gate circuit in the clamping circuit to generate the second data signal. When applied to a single bit signal, the clamping gate circuit is an AND gate.

In an example in which a reset signal with a low level is considered valid, the function of the clamping circuit is to ensure that when the reset signal is low, the second data signal is not in a metastable state when being sent to the second data unit and is kept at a low level, so as to clamp the reset signal; when the reset signal is high, that is, the first data unit is not reset, the first data signal output by the first data unit is kept at the original level and input to the second data unit, which does not affect the original data path.

It should be noted that, using an AND logic gate as a clamping gate circuit is only an exemplary implementation in the embodiments of the present disclosure, which does not impose a limitation on the technical solution of the embodiments of the present disclosure, and the clamping circuit is not limited to the AND logic gate.

The embodiments of the present disclosure provide a method of resetting an integrated circuit. The method may be used for performing synchronous processing on a reset signal and then inputting the synchronous reset signal to a corresponding data unit, and when the data unit is reset, outputting, by virtue of the effect of clamping the synchronous reset signal and a data signal output by the data unit, a data signal without a metastable state, thereby effectively reducing the risk of spreading the metastable state caused by the reset operation across the reset domains when the chip performs local reset processing, and improving the reliability of the reset operation in different reset domains. Meanwhile, the embodiments of the present disclosure are not only applicable to a cross-reset domain logic in a normal situation, but also applicable to a scenario in which a reset operation is performed on IP cores in different reset domains, and applicable to data units in different power domains or different voltage domains. The solution in the embodiments of the present disclosure does not require the addition of a circuit module, unit or device in a reset domain that receives data, and does not require additional control on the operation of the reset signal, and therefore is simple, efficient and widely applicable.

Figure 3:
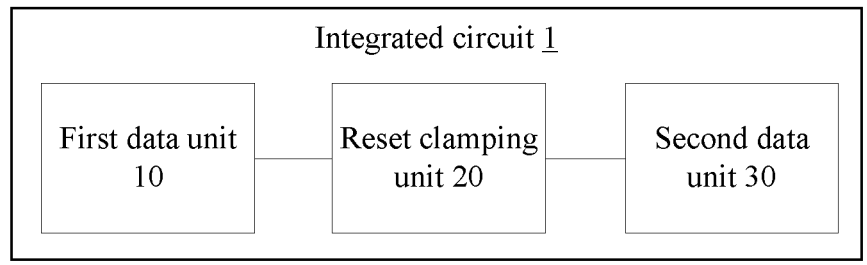
FIG. 3 is a schematic structural diagram of an integrated circuit provided in the embodiments of the present disclosure.

FIG. 3 is a schematic structural diagram of an integrated circuit provided in the embodiments of the present disclosure. As shown in FIG. 3, the integrated circuit 1 includes a first data unit 10, a reset clamping unit 20 and a second data unit 30.

The first data unit 10 and the second data unit 30 belong to different reset domains.

The reset clamping unit 20 is configured to: receive a reset signal intended for the first data unit 10, generate a synchronous reset signal based on the reset signal, and output the synchronous reset signal to the first data unit 10 after at least one preset period, wherein the reset signal is supposed to reset the first data unit 10, and the synchronous reset signal is delayed by N preset periods relative to the reset signal, N being greater than or equal to 2; and receive a first data signal output by the first data unit 10 and intended for the second data unit 30, generate a second data signal based on the synchronous reset signal and the first data signal, and output the second data signal to the second data unit 30.

It should be noted that an integrated circuit may include a plurality of units, and any two of the units which are located in different reset domains and need to transmit a data signal therebetween may be the first data unit 10 and the second data unit 30 in the embodiments of the present disclosure. In addition, respective IP cores integrated in an SoC may also serve as the first data unit 10 and the second data unit 30 in the embodiments of the present disclosure. The above-mentioned implementations are merely exemplary implementations provided for the convenience of description in the present disclosure, and are not intended to limit the technical solutions of the embodiments of the present disclosure, and the first data unit 10 and the second data unit 30 in the technical solution.

Figure 4:
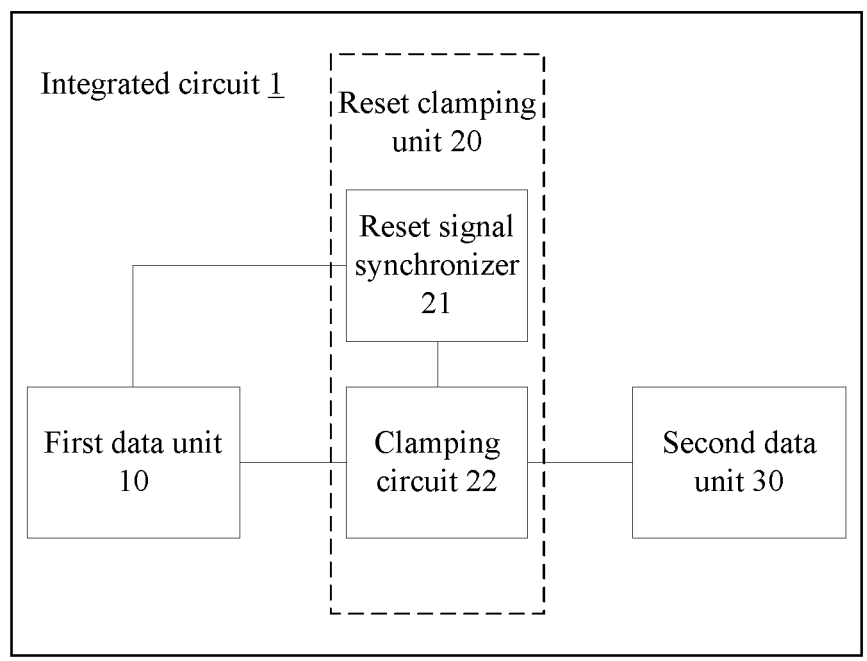
FIG. 4 is a schematic structural diagram of another integrated circuit provided in the embodiments of the present disclosure.

FIG. 4 is a schematic structural diagram of another integrated circuit provided in the embodiments of the present disclosure. As shown in FIG. 4, the structure is an implementation based on the structure shown in FIG. 3. Exemplarily, based on the structure shown in FIG. 3, the reset clamping unit 20 includes: a reset signal synchronizer 21 and a clamping circuit 22.

The reset signal synchronizer 21 is configured to receive the reset signal, generate the synchronous reset signal based on the reset signal, output the synchronous reset signal to the clamping circuit 22, and output the synchronous reset signal to the first data unit 10 through a delay register.

In some implementations, the reset signal synchronizer 21 is an N-stage register synchronizer, and each preset period is a cycle of a synchronous clock signal. The reset signal synchronizer 21 is configured to generate the synchronous reset signal by delaying a starting moment of the reset signal until a preset trigger edge after N cycles of the synchronous clock signal; and delay, through the delay register, the synchronous reset signal by a cycle of a synchronous clock signal and output the delayed synchronous reset signal to the first data unit 10.

The clamping circuit 22 is configured to receive the synchronous reset signal and the first data signal, generate the second data signal based on the synchronous reset signal and the first data signal, and output the second data signal to the second data unit 30.

In some implementations, the clamping circuit 22 is configured to input the synchronous reset signal and the first data signal to a clamping gate circuit in the clamping circuit to generate the second data signal.

In some implementations, the reset clamping unit 20 further includes the delay register, or the delay register is disposed in the reset signal synchronizer.

The IC reset method provided in the embodiments of the present disclosure will be described below in conjunction with practical applications.

Figure 5:
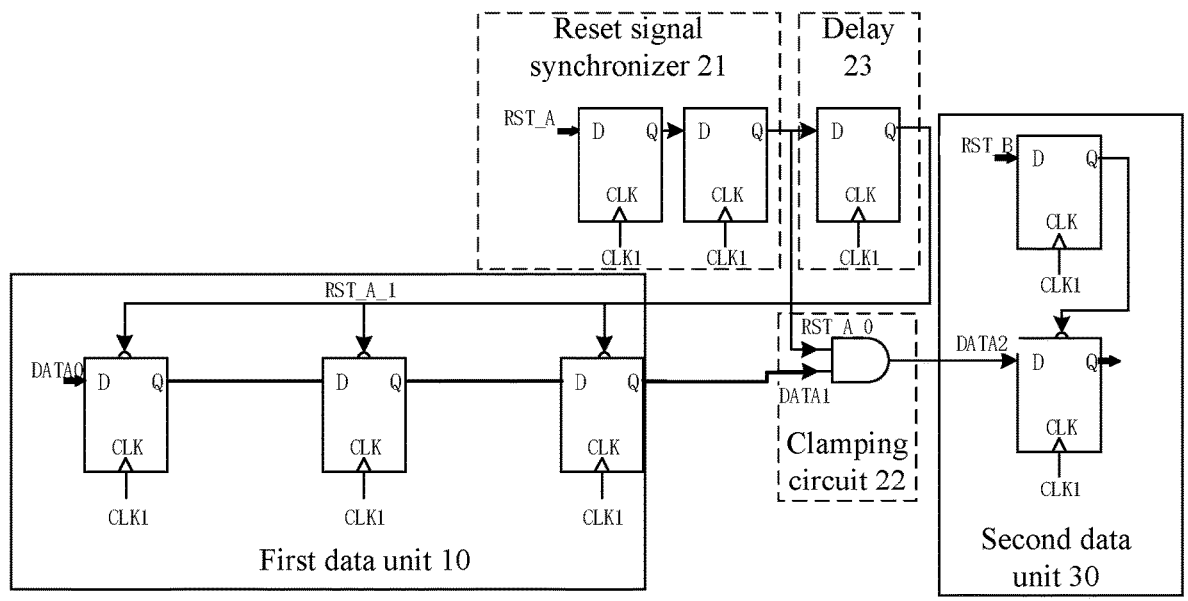
FIG. 5 is a schematic structural diagram of still another integrated circuit provided in the embodiments of the present disclosure.

FIG. 5 is a schematic structural diagram of still another integrated circuit provided in the embodiments of the present disclosure. As shown in FIG. 5, the integrated circuit includes: a first data unit 10, a reset clamping unit and a second data unit 30. The first data unit 10 includes three registers and a certain amount of combinational logic (not shown in the figure). The reset clamping unit includes: a reset signal synchronizer 21, a delay 23 and a clamping circuit 22, wherein the reset signal synchronizer 21 is composed of two (N=2) stages of D flip-flops with the input bit width of 1 bit. The delay 23, i.e., a delay register, is realized by a D flip-flop. The clamping gate circuit in the clamping circuit 22 is implemented by an AND logic gate. The second data unit 30 belongs to a different reset domain from the first data unit 10 and includes a plurality of registers. Each rectangular block (D flip-flop) in FIG. 5 is a register, where CLK represents an input of a synchronous clock signal (CLK1), D represents an input port of a data signal, and Q represents an output port of a data signal.

Figure 6:
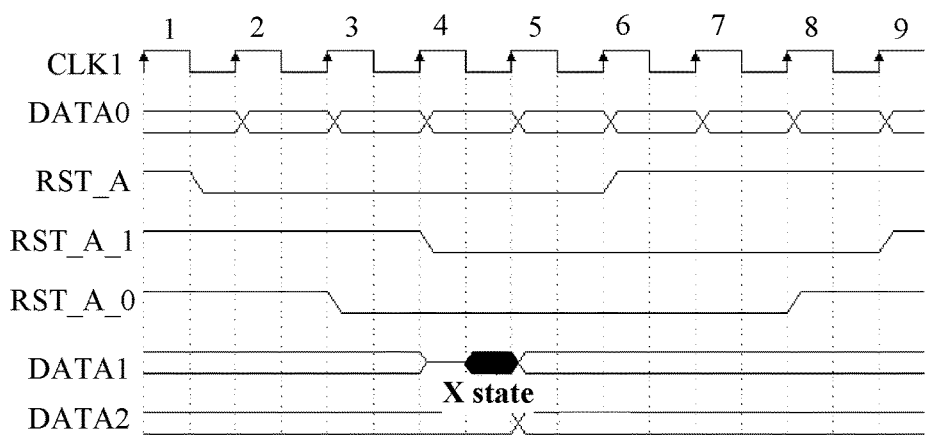
FIG. 6 is a diagram of signal timing in resetting a first data unit in the integrated circuit of FIG. 5.

FIG. 6 is a diagram of signal timings in resetting the first data unit 10 in the integrated circuit shown in FIG. 5. As shown in FIGS. 5 and 6, in the reset clamping unit, the reset signal synchronizer 21 is configured to receive a first reset signal (RST_A) intended for the first data unit 10, delay the start moment of the first reset signal to a rising edge of the synchronous clock signal after two cycles, so as to generate a synchronous reset signal (RST_A_0), and output the synchronous reset signal to the delay 23 and the clamping circuit 22. It can be seen that the first reset signal and the synchronous clock signal are in different clock domains. The first reset signal changes from high to low at a certain moment in the first cycle of the synchronous clock signal, the first reset signal is valid when being low, and the synchronous reset signal is output when triggered by a rising edge at the third cycle of the synchronous clock signal after the first reset signal is subjected to two stages of synchronization processing. The delay 23 delays the synchronous reset signal by one cycle of the synchronous clock signal to generate a second reset signal (RST_A_1), and outputs the second reset signal to the first data unit 10, wherein the second reset signal is obtained by registering the synchronous reset signal by the delay 23, and is output in the fourth cycle of the synchronous clock signal.

The first data unit 10 receives the second reset signal and is reset based on the second reset signal, and at the same time, a single-bit initial data signal (DATA0) is processed by the three registers and the certain amount of combinational logic to output a first data signal (DATA1). Since the resetting of respective registers is asynchronous in the fourth cycle of the synchronous clock signal, the first data signal is in a metastable state (X state). The first data unit 10 outputs the first data signal to the clamping circuit 22, and the clamping circuit 22 inputs the received synchronous reset signal and the first data signal into the clamping gate circuit to generate a second data signal (DATA2) and output the second data signal to the second data unit 30. The first data signal and the synchronous reset signal which is pulled down to a low level at the third cycle of the synchronous clock signal are processed by an AND logic gate to output the second data signal, which is no longer in the metastable state.

Those having ordinary skill in the art may understand that all or some of the operations in the methods and functional modules/units in the devices disclosed in the foregoing may be implemented as software, firmware, hardware, and a proper combination thereof. In a hardware implementation, the division between functional modules/units referred to in the above description does not necessarily correspond to the division of physical components. For example, one physical component may have multiple functions, or one function or operation may be cooperatively performed by several physical components. Some or all of the physical components may be implemented as software executed by a processor, such as a central processor, digital signal processor, or microprocessor, or as hardware, or as an integrated circuit, such as an application specific integrated circuit. Such software may be distributed on computer-readable media, which may include computer storage media (or non-transitory media) and communication media (or transitory media). As is well known to those having ordinary skill in the art, the term computer storage media includes both volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication media typically embodies computer readable instructions, data structures, program modules, or other data in a modulated data signal such as a carrier wave or other transport mechanism and may include any information delivery media as is known to those having ordinary skill in the art.

Exemplary embodiments have been disclosed herein, and while specific terms are employed, they are used and should be interpreted in a generic and descriptive sense only and not for purposes of limitation. In some instances, as would be apparent to those having ordinary skill in the art, features, characteristics, and/or elements described in connection with the exemplary embodiments may be used singly or in combination with features, characteristics, and/or elements described in connection with other embodiments unless otherwise specifically indicated. It will thus be understood by those having ordinary skill in the art that various changes in form and details may be made therein without departing from the scope of the present disclosure as set forth in the appended claims.

What is claimed is:

1. A method of resetting an integrated circuit, comprising:
generating, in response to a reset signal intended for a first data unit comprised in the integrated circuit, a synchronous reset signal based on the reset signal, and outputting the synchronous reset signal to the first data unit after at least one preset period, wherein the synchronous reset signal is used for resetting the first data unit, and the synchronous reset signal is delayed by N preset periods relative to the reset signal, N being greater than or equal to 2; and
generating, in response to a first data signal output by the first data unit and intended for a second data unit comprised in the integrated circuit, a second data signal based on the synchronous reset signal and the first data signal, and outputting the second data signal to the second data unit, wherein the first data unit and the second data unit belong to different reset domains.

2. The method according to claim 1, wherein generating, in response to the reset signal intended for the first data unit, the synchronous reset signal based on the reset signal, and outputting the synchronous reset signal to the first data unit after at least one preset period comprises:

generating, in response to the reset signal input to a reset signal synchronizer, the synchronous reset signal based on the reset signal; outputting the synchronous reset signal to a clamping circuit, and outputting the synchronous reset signal to the first data unit through a delay register; and generating, in response to the first data signal output by the first data unit, the second data signal based on the synchronous reset signal and the first data signal, and outputting the second data signal to the second data unit comprises:

generating, in response to the first data signal and the synchronous reset signal input to the clamping circuit, the second data signal based on the synchronous reset signal and the first data signal.

3. The method according to claim 1, wherein the first data signal output by the first data unit is a data signal generated or forwarded by the first data unit.

4. The method according to claim 1, wherein the first data unit and the second data unit further belong to different power supply domains or voltage domains.

5. The method according to claim 1, wherein after outputting the synchronous reset signal to the first data unit after at least one preset period, the method further comprises:

resetting the first data unit based on the synchronous reset signal.

6. The method according to claim 1, wherein generating the second data signal based on the synchronous reset signal and the first data signal comprises:

clamping the first data signal output from the first data unit with the synchronous reset signal.

7. The method according to claim 1, wherein generating the second data signal based on the synchronous reset signal and the first data signal comprises:

delaying the first data signal or filling the first data signal with 0 based on the synchronous reset signal to generate the second data signal.

8. The method according to claim 1, wherein generating the second data signal based on the synchronous reset signal and the first data signal comprises:

filtering portions of the first data signal that have a possibility of being in a metastable state based on the synchronous reset signal.

9. The method according to claim 1, wherein the first data unit and the second data unit are:

any two units of the integrated circuit which are located in different reset domains and need to transmit a data signal between the two units; or, any two IP cores integrated in an SoC of the integrated circuit.

10. The method according to claim 2, wherein the reset signal synchronizer is an N-stage register synchronizer, and each preset period is a cycle of a synchronous clock signal, and wherein generating the synchronous reset signal based on the reset signal comprises:

generating the synchronous reset signal by delaying a starting moment of the reset signal until a preset trigger edge after N cycles of the synchronous clock signal.

11. The method according to claim 2, wherein outputting the synchronous reset signal to the first data unit through the delay register comprises:

delaying, through the delay register, the synchronous reset signal by a cycle of a synchronous clock signal and outputting the delayed synchronous reset signal to the first data unit.

12. The method according to claim 2, wherein generating the second data signal based on the synchronous reset signal and the first data signal comprises:

inputting the synchronous reset signal and the first data signal to a clamping gate circuit in the clamping circuit to generate the second data signal.

13. An integrated circuit, comprising:
a first data unit;
a second data unit belonging to a different reset domain than the first data unit;
a reset clamping unit, configured to:
receive a reset signal intended for the first data unit, generate a synchronous reset signal based on the reset signal, and output the synchronous reset signal to the first data unit after at least one preset period, wherein the synchronous reset signal is used for resetting the first data unit, and the synchronous reset signal is delayed by N preset periods relative to the reset signal, N being greater than or equal to 2; and
receive a first data signal output by the first data unit and intended for the second data unit, generate a second data signal based on the synchronous reset signal and the first data signal, and output the second data signal to the second data unit.

14. The integrated circuit according to claim 13, wherein the reset clamping unit comprises a reset signal synchronizer and a clamping circuit, wherein the reset signal synchronizer is configured to receive the reset signal, generate the synchronous reset signal based on the reset signal, output the synchronous reset signal to the clamping circuit, and output the synchronous reset signal to the first data unit through a delay register; and the clamping circuit is configured to receive the synchronous reset signal and the first data signal, generate the second data signal based on the synchronous reset signal and the first data signal, and output the second data signal to the second data unit.

15. The integrated circuit according to claim 13, wherein the first data unit and the second data unit further belong to different power supply domains or voltage domains.

16. The integrated circuit according to claim 13, wherein the first data unit is reset based on the synchronous reset signal.

17. The integrated circuit according to claim 14, wherein the reset signal synchronizer is an N-stage register synchronizer, and each preset period is a cycle of a synchronous clock signal, and wherein the reset signal synchronizer is configured to generate the synchronous reset signal by delaying a starting moment of the reset signal until a preset trigger edge after N cycles of the synchronous clock signal.

18. The integrated circuit according to claim 14, wherein the reset signal synchronizer is configured to delay, through the delay register, the synchronous reset signal by a cycle of a synchronous clock signal and output the delayed synchronous reset signal to the first data unit.

19. The integrated circuit according to claim 14, wherein the clamping circuit comprises a clamping gate circuit which is configured to receive the synchronous reset signal and the first data signal and generate the second data signal.

20. The integrated circuit according to claim 19, wherein the clamping gate circuit is an AND gate.

* * * * *